(12) United States Patent
Black

(10) Patent No.: US 9,875,321 B2
(45) Date of Patent: Jan. 23, 2018

(54) GEO-LOCATION CUSTOM INDEXES

(71) Applicant: salesforce.com, inc., San Francisco, CA (US)

(72) Inventor: Nathanael Black, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 386 days.

(21) Appl. No.: 14/334,425

(22) Filed: Jul. 17, 2014

(65) Prior Publication Data

US 2015/0026190 A1   Jan. 22, 2015

Related U.S. Application Data

(60) Provisional application No. 61/856,411, filed on Jul. 19, 2013.

(51) Int. Cl.
*G06F 17/30* (2006.01)

(52) U.S. Cl.
CPC .... *G06F 17/30961* (2013.01); *G06F 17/3087* (2013.01); *G06F 17/30241* (2013.01)

(58) Field of Classification Search
CPC ......... G06F 17/30961; G06F 17/30241; G06F 17/3087
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |

(Continued)

OTHER PUBLICATIONS

Fu et al., "Dynamic vp-tree indexing for n-nearest neighbor search given pair-wise distances," The VLDB Journal—The International Journal on Very Large Data Bases 9.2 (2000): 154-173.*

(Continued)

*Primary Examiner* — Jay Morrison

(74) *Attorney, Agent, or Firm* — Alpine Technology Law Group LLC

(57) ABSTRACT

Apparatuses, systems, and methods for generating and utilizing custom indexes for a plurality of geo-locations are described. A plurality of indexes are generated, each corresponding to one of a plurality of geo-locations, based on spatial area subdivisions of a space including the plurality of geo-locations. A points of interest (POIs) query is received, wherein results of the query are to be limited by a distance value. One or more geo-locations are identified as POIs within the distance value from a first geo-location of the plurality of geo-locations based on the corresponding indexes of the one or more identified geo-locations.

8 Claims, 15 Drawing Sheets

(56) References Cited

U.S. PATENT DOCUMENTS

| | | | |
|---|---|---|---|
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 8,954,860 B1* | 2/2015 | Hands | G06F 17/30873 715/738 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0184231 A1* | 12/2002 | Baskins | G06F 17/30961 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0192301 A1* | 8/2007 | Posner | G06F 17/30327 |
| 2009/0204597 A1* | 8/2009 | Mani | G06F 17/3087 |
| 2011/0145228 A1* | 6/2011 | Laurenzo | G01C 21/32 707/723 |
| 2011/0246478 A1* | 10/2011 | Deng | G06F 17/30241 707/743 |
| 2013/0325903 A1* | 12/2013 | Rohlf | G06F 17/30241 707/797 |
| 2014/0274154 A1* | 9/2014 | Rana | G06Q 30/0282 455/456.3 |

OTHER PUBLICATIONS

Kuba, "Data structures for spatial data mining," Publications in the FI MU Report Series, Sep. 2001.*

* cited by examiner

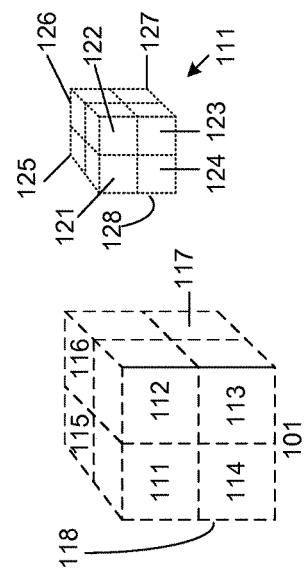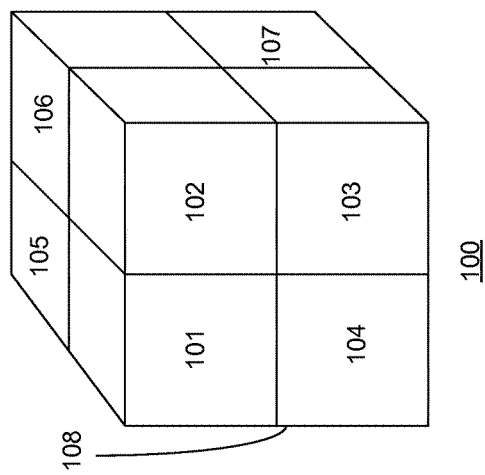
FIG. 1A

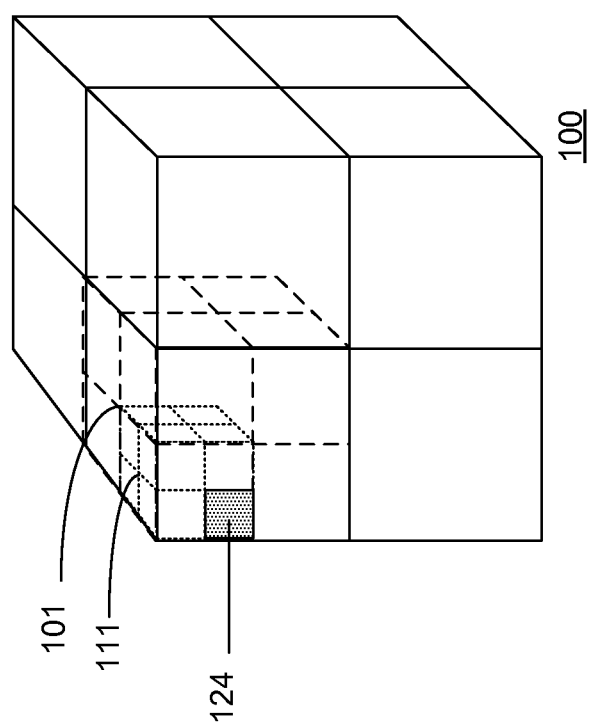

150

| Nodes (as shown in FIG 1A-1B) | Index |
|---|---|
| 101 | 1/0/0 or '100' |
| 102 | 2/0/0 or '200' |
| 103 | 3/0/0 or '300' |
| 104 | 4/0/0 or '400' |
| 105 | 5/0/0 or '500' |
| 106 | 6/0/0 or '600' |
| 107 | 7/0/0 or '700' |
| 108 | 8/0/0 or '800' |
| ... | ... |
| 111 | 1/1/0 or '110' |
| 112 | 1/2/0 or '120' |
| 113 | 1/3/0 or '130' |
| 114 | 1/4/0 or '140' |
| 115 | 1/5/0 or '150' |
| 116 | 1/6/0 or '160' |
| 117 | 1/7/0 or '170' |
| 118 | 1/8/0 or '180' |
| ... | ... |
| 121 | 1/1/1 or '111' |
| 122 | 1/1/2 or '112' |
| 123 | 1/1/3 or '113' |
| 124 | 1/1/4 or '114' |
| 125 | 1/1/5 or '115' |
| 126 | 1/1/6 or '116' |
| 127 | 1/1/7 or '117' |
| 128 | 1/1/8 or '118' |

160

Level 1
251

250

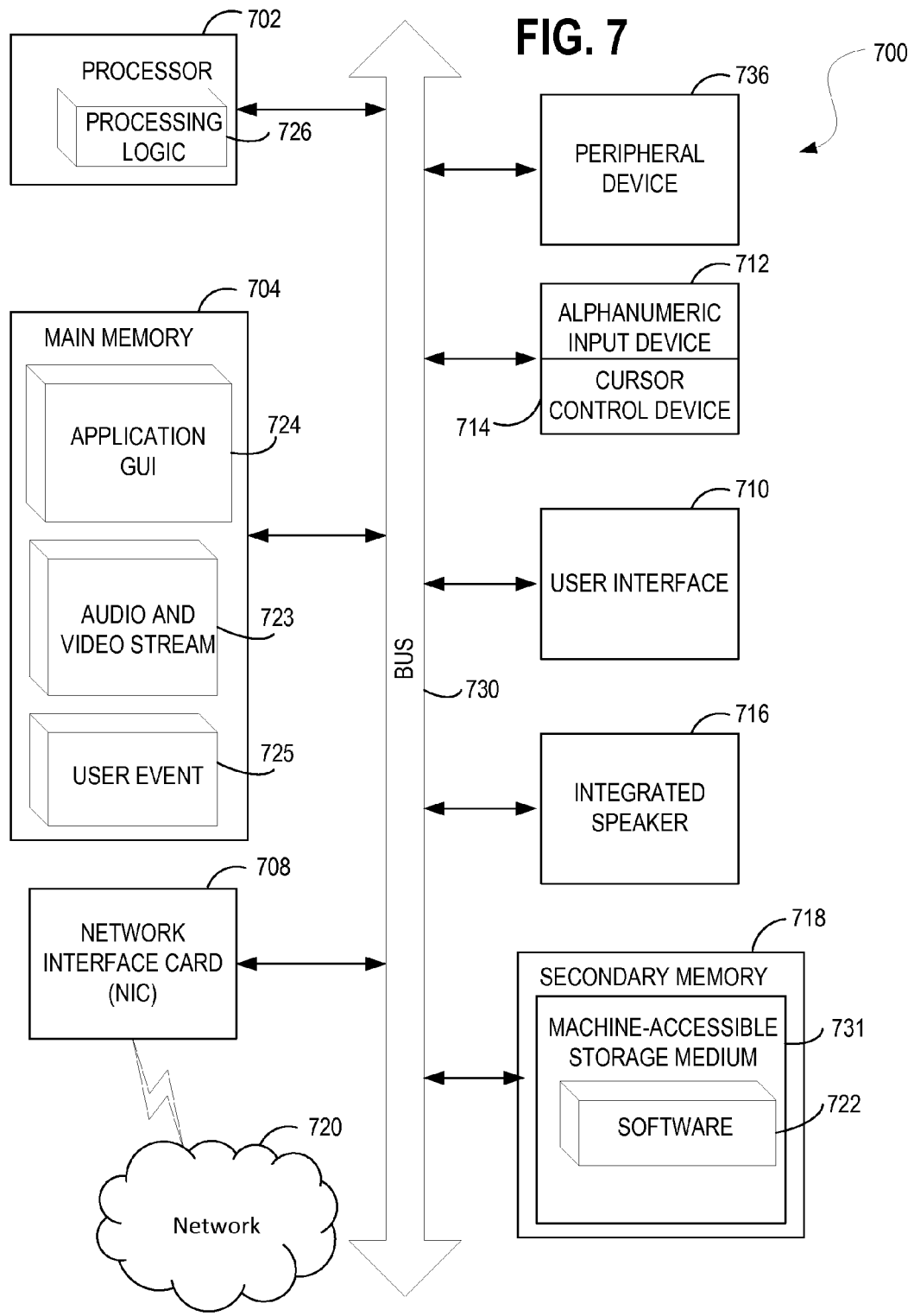

GEO-LOCATION CUSTOM INDEXES

CLAIM OF PRIORITY

This application claims the benefit of U.S. Provisional Patent Application 61/856,411 entitled GEOLOCATION CUSTOM INDEXES, by Black, Nathanael, filed Jul. 19, 2013, the entire contents of which are incorporated herein by reference.

TECHNICAL FIELD

Embodiments of the invention relate generally to the field of computing, and more particularly, to systems, methods, and apparatuses for creating custom for a plurality of geo-locations. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

For computing devices—e.g., a mobile computing device, a navigation device, a smartphone, etc., a "point of interest" (POI) query describes a query by a user of a computing device to identify geo-locations that are of particular interest to the user. The user may identify potential POIs by location name, service provided, location type, etc. Potential POIs may further be limited by their distance from a user's current location or distance from a location specified by the user's query.

Attributes of various geo-locations may be stored in a database included in or accessible by a computing device. These attributes may also include location information for each geo-location. An example of location information data is the geographic coordinate system of latitude, longitude, and elevation (i.e., altitude).

Disadvantages of utilizing multiple coordinates (such as latitude, longitude, elevation) to store location information data include maintaining a plurality of variables to represent a location, and computation-intensive operations to determine a distance value between two or more geo-locations.

BRIEF DESCRIPTION OF THE DRAWINGS

Embodiments are illustrated by way of example, and not by way of limitation, and will be more fully understood with reference to the following detailed description when considered in connection with the figures in which:

FIG. 1A-FIG. 1C are illustrations of an octree spatial data structure and indexing table according to an embodiment of the disclosure.

FIG. 7 illustrates a computing device to process user POI queries according to an embodiment of the disclosure.

DETAILED DESCRIPTION

Described herein are systems, methods, and apparatuses for generating custom indexes for geo-locations. Embodiments of the disclosure utilize spatial area subdivisions to efficiently identify point of interest (POI) locations. Embodiments describe processes for dividing a finite two-dimensional (2D) or three-dimensional (3D) space into subdivisions; this subdivision process may recursively divide these subdivisions until individual points of interest locations are mapped to individual subdivisions. An index may be generated where an index value is an encoding of a location's position in the spatial area.

Embodiments of the disclosure may utilize various data structures to represent the above described spatial area subdivisions. For example, quadtrees and octrees are spatial data structures that successively partition a region of space into 4 or 8 equally sized partitions alternatively referred to herein as cells, respectively. Quadtrees and octrees may be represented in a hierarchical tree structure comprised of a root cell, intermediate cells, and leaf cells. Other embodiments may not utilize quadtrees or octrees, but instead other tree structures having a different branching factor or a variable number of branches at each node.

Figure 1C:
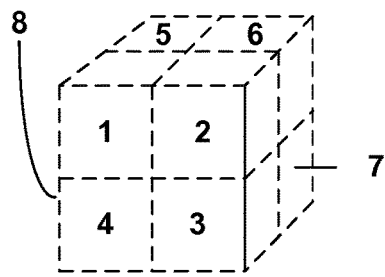

FIG. 1A-FIG. 1C are illustrations of an octree spatial data structure and indexing table according to an embodiment of the disclosure. An octree is an example of a hierarchical data structure used to completely partition a finite 3D space. This partitioning is performed by recursively subdividing the finite 3D space into eight equal pieces, or octants. Each node in the octree hierarchical data structure is recursively subdivided such that the space represented by each node is in one of the eight octants.

In this embodiment, starting from root cell 100, cells are successively subdivided into smaller cells. Root cell 100 is shown to be subdivided into intermediate cells 101-108 (note that cell 108 is not visible is illustrated in FIG. 1A, but its location is indicated). Each of these intermediate cells is subdivided into smaller intermediate cells; in this illustration, intermediate cell 101 is shown to be subdivided into cells 111-118. Each of these intermediate cells is subdivided into smaller intermediate cells; in this illustration, intermediate cell 111 is shown to be subdivided into cells 121-128. Note that other subdivided cells within root cell 100 are not shown in FIG. 1B for the purposes of illustration clarity only. This subdivision process continues until a certain condition is met—e.g., a cell size or cell quantity limit is reached.

In contrast to multi-coordinate systems (such as the geographic coordinate system), quadtrees and octrees can reduce the amount of data needed to store location data, and improve execution times for querying and processing this data. Instead of multiple coordinate values, an index may be generated where an index value is an encoding of a cell position in an octree. For example, the embodiment illustrated comprises three recursive subdivided levels. If each cell is numbered consistently in each of the levels, a cell's location may be represented by a single index value string.

FIG. 1C illustrates exemplary subdivided space 150 and a corresponding number system for each partition (i.e., the numbering of the eight subdivisions with respect to its parent node). In embodiments, custom indexes for geo-locations are created such that sub-divisions of a parent node are in the same numeric range; with regards to the example illustrated in FIG. 1C, sibling nodes may share the same prefix.

Third-level octree cells may be identified by a three-digit value, wherein each digit represents a cell level location. As this example comprises an octree, this three-digit value may comprise a [1-8]/[1-8]/[1-8] value. Table 160 illustrates indexes for each of the octree cells illustrated in FIG. 1A-1B. In this example, cell 101 is given the index 1/0/0 or '100'—i.e., '1' to indicate its position within cell 100 and '00' to indicate that it is a level-1 cell (and thus, no level-2 or level-3 identifiers). Cells 102-108 are similarly given the indexes '200'-'800.' In other embodiments, no additional suffix is given to a level-1 cell index.

Cell 111 is given the index 1/1/0 or '110'—i.e., '1' to indicate its position within cell 100, '1' to indicate its position in cell 101, and '0' to indicate that it is a level-2 cell (and thus, no level-3 identifier). Cells 112-118 are similarly given the indexes '120'-'180.' As cells 111-118 are sibling cells (i.e., all are included in cell 101), in this example their corresponding indexes all share the prefix '1xx.'

Cell 124 is given the index 1/1/4 or '114'—i.e., '1' to indicate its position within cell 100, '1' to indicate its position in cell 101, and '4' to indicate its position in cell 111. Cells 121-123 and 125-128 are similarly given the indexes '111'-'113' and '125'-'128.' As cells 121-128 are sibling cells (i.e., all are included in cell 111), in this example their corresponding indexes all share the prefix '11x.'

For other octree nodes not illustrated in FIG. 1A-1B, their indexes would be created in a similar fashion. In contrast to the above described exemplary embodiment, no additional suffix may be given to any intermediate cell index in other embodiments. For example, in some embodiments, cells 101-108 may be given the index values '1'-'8,' cells 111-118 may be given the index values '11'-'18,' etc. Furthermore, in other embodiments, intermediate cells such as cells 101-108 and 111-118 are not given any index values. In various embodiments, how each subdivided partition and how indexes are created and assigned may vary; however, embodiments create indexes such that shared portions of these indexes (e.g., index ranges, prefixes, suffixes, etc.) may be used to determine distance data for a plurality of geo-locations. The creation of these custom indexes is described in further detail below.

Figure 2A:
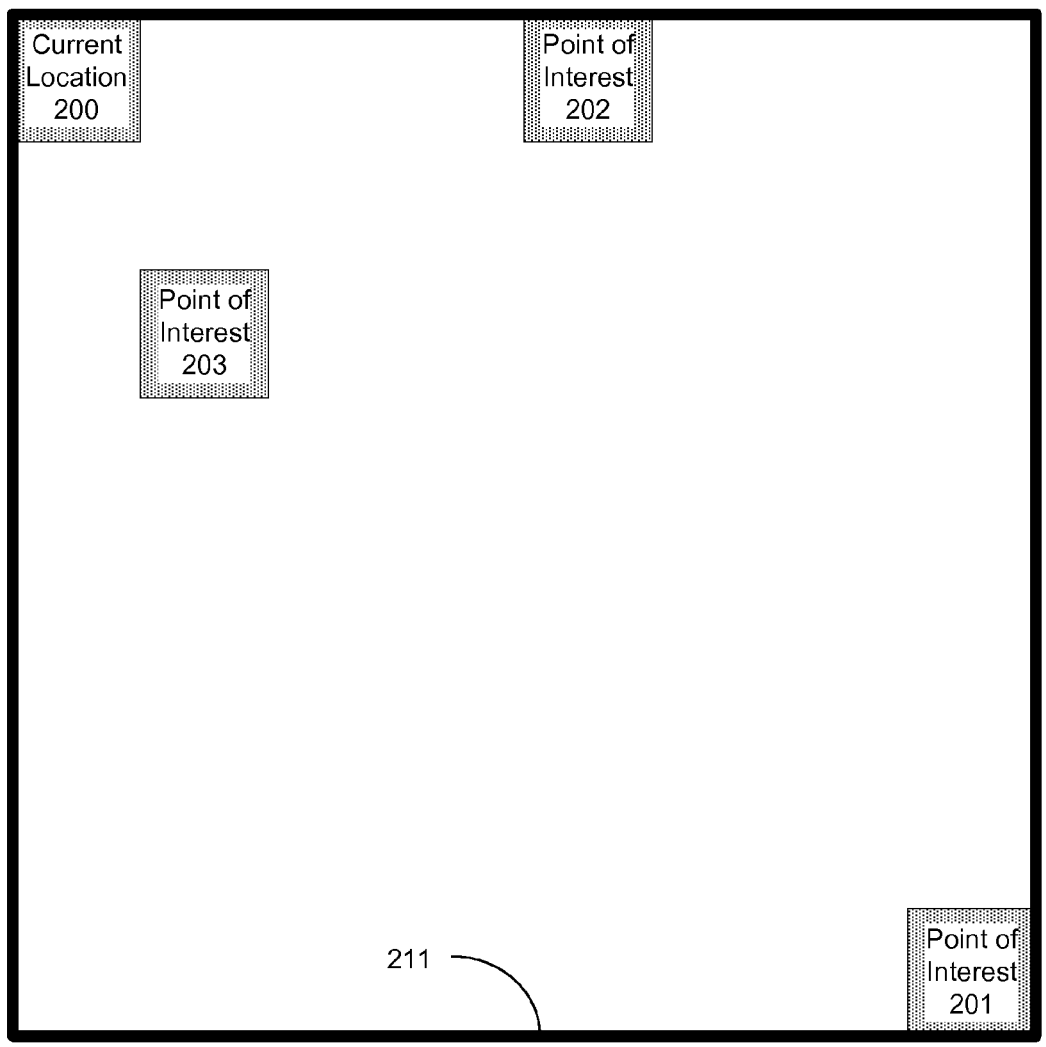
FIG. 2A is an illustration of an index creation operation for a user location and surrounding points of interest (POIs) according to an embodiment of the disclosure.

FIG. 2A is an illustration of an index creation operation for a user location and surrounding POIs according to an embodiment of the disclosure. In this embodiment, current location 200 illustrates a location of a user of a computing device. The user may enter a POI query to find locations based on any criteria—e.g., entity name, business type, services provided, etc.

In this embodiment, cell 211 is shown to comprise a finite space surrounding current location 200. This space is illustrated as a 2D space for the purposes of simplifying this illustration and subsequent related illustrations; other embodiments may utilize a 3D space. The dimensions of cell 211 may be based on a distance value specified by the user (e.g., a query for POIs within X miles), or may be based on any other distance related criteria (e.g., reasonable walking distance, reasonable driving distance, etc.). The placement of current location 200 within cell 211 is an exemplary placement for illustrative purposes only; other embodiments may create cell 211 such that current location 200 is relatively centered within the cell.

Figure 2B:
FIG. 2B is an illustration of a quadtree index tree according to an embodiment of the disclosure.

POIs 201-203 are shown to be included in cell 211. Other POIs that are located outside of cell 211 may be excluded from the described index creation process. FIG. 2B is an illustration of a quadtree index tree according to an embodiment of the disclosure. As described above, cell 211 of FIG. 2A is illustrated as a 2D space, and thus quadtrees (as opposed to octrees) are used to create spatial area subdivisions of the space enclosed by cell 211, as described in further detail below. At this stage of the index creation process, only level 251 (i.e., "Level 1") exists to represent the space enclosed by cell 211. The node of this level is shaded in this embodiment to indicate that it includes the current location and/or a POI.

Figure 3A:
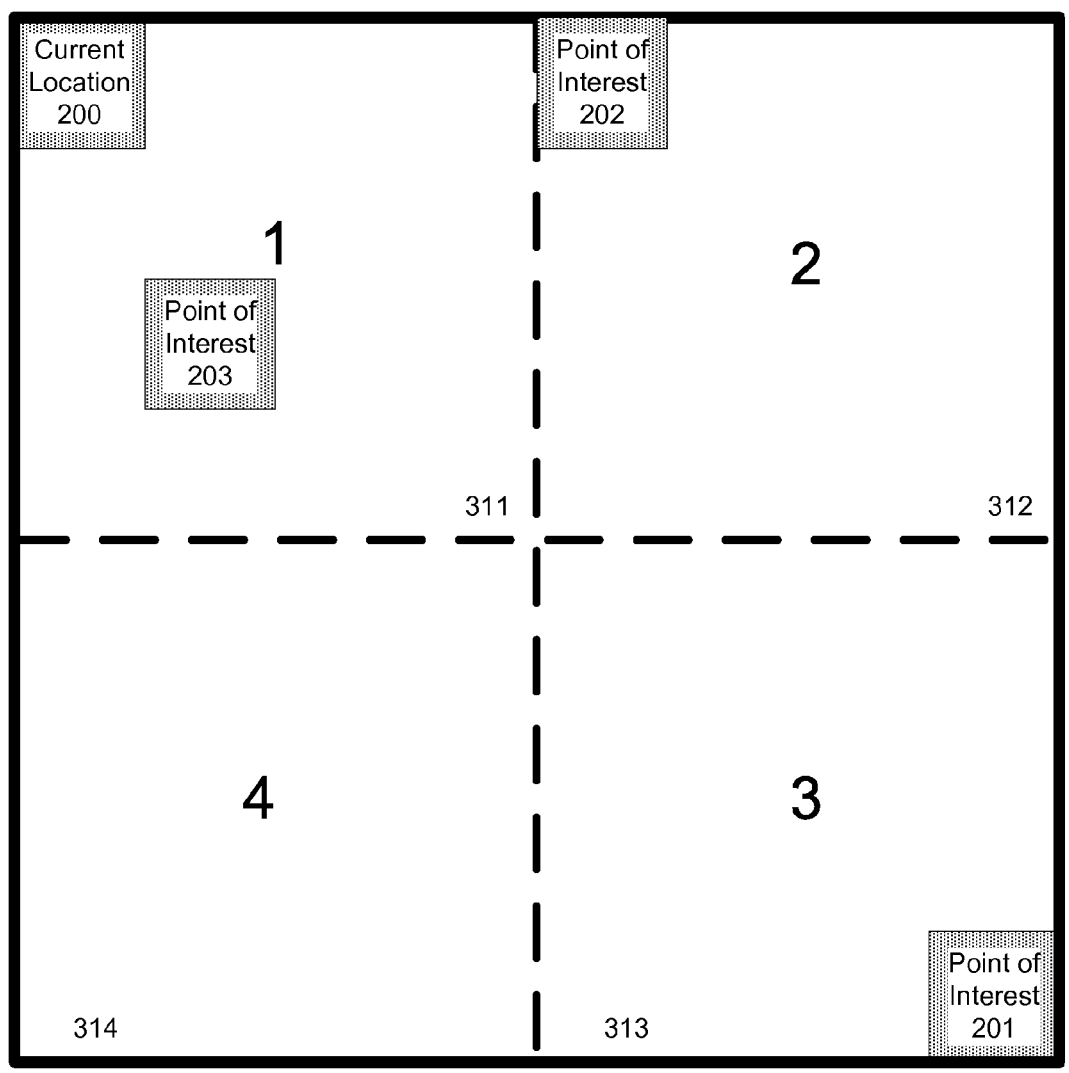
FIG. 3A is an illustration of an index creation operation for a user location and surrounding POIs according to an embodiment of the disclosure.

FIG. 3A is an illustration of an index creation operation for a user location and surrounding POIs according to an embodiment of the disclosure. In this embodiment, cell 211 of FIG. 2A is shown to be subdivided into intermediate cells 311-314. The number system of each intermediate cell is also illustrated (i.e., the numbering of the subdivisions with respect to the quadtree index tree of FIG. 3B); this is to be consistent for each subsequent subdivision. As shown in this illustration, cell 311 includes current location 200 and POI 203, cell 312 includes POI 202, and cell 313 includes POI 201.

Figure 3B:
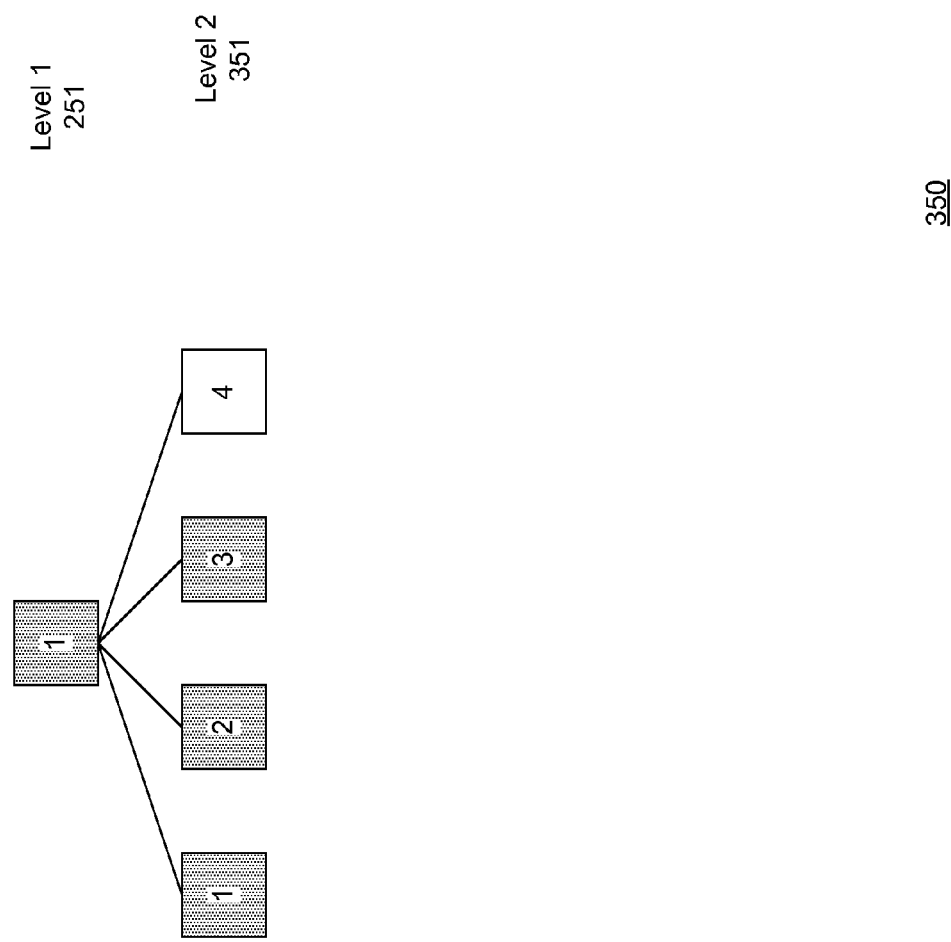
FIG. 3B is an illustration of a quadtree index tree according to an embodiment of the disclosure.

FIG. 3B is an illustration of a quadtree index tree according to an embodiment of the disclosure. At this stage of the index creation process, level 351 (i.e., "Level 2") is added to tree 350 to represent intermediate cells 311-314. The nodes of Level 2 representing intermediate cells 311-313 (i.e., nodes 1-3 of level 351) are shaded in this embodiment to indicate that each of these cells includes the current location and/or a POI.

Figure 4A:
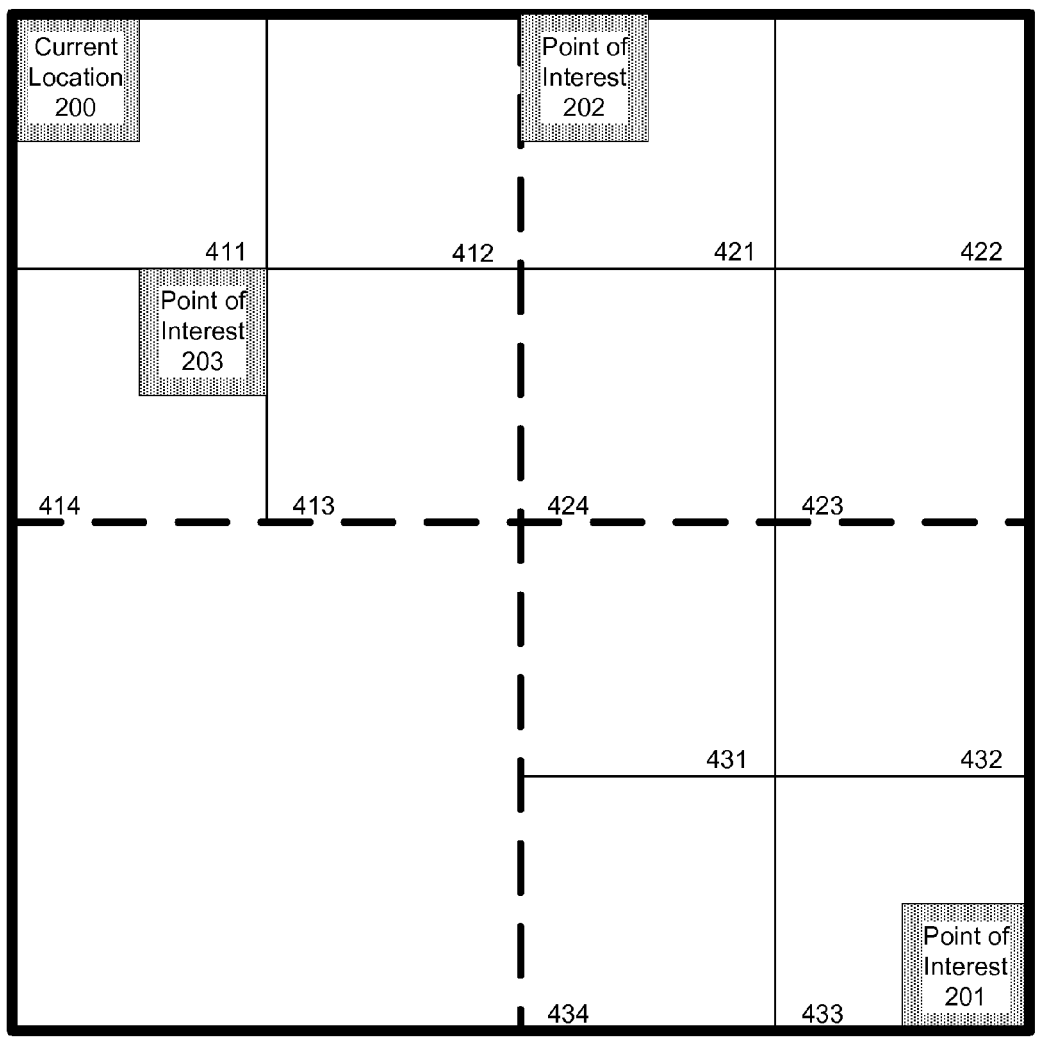
FIG. 4A is an illustration of an index creation operation for a user location and surrounding POIs according to an embodiment of the disclosure.

FIG. 4A is an illustration of an index creation operation for a user location and surrounding POIs according to an embodiment of the disclosure. In this embodiment, cells 311-313 of FIG. 3A are each shown to be subdivided into intermediate cells 411-414, 421-424, and 431-434, respectively. In this embodiment, cell 314 of FIG. 3A is not subdivided, as it does contain the user's current location of any POIs. As shown in this illustration, cell 411 includes current location 200, cell 414 includes POI 203, cell 421 includes POI 202, and cell 433 includes POI 201.

Figure 4B:
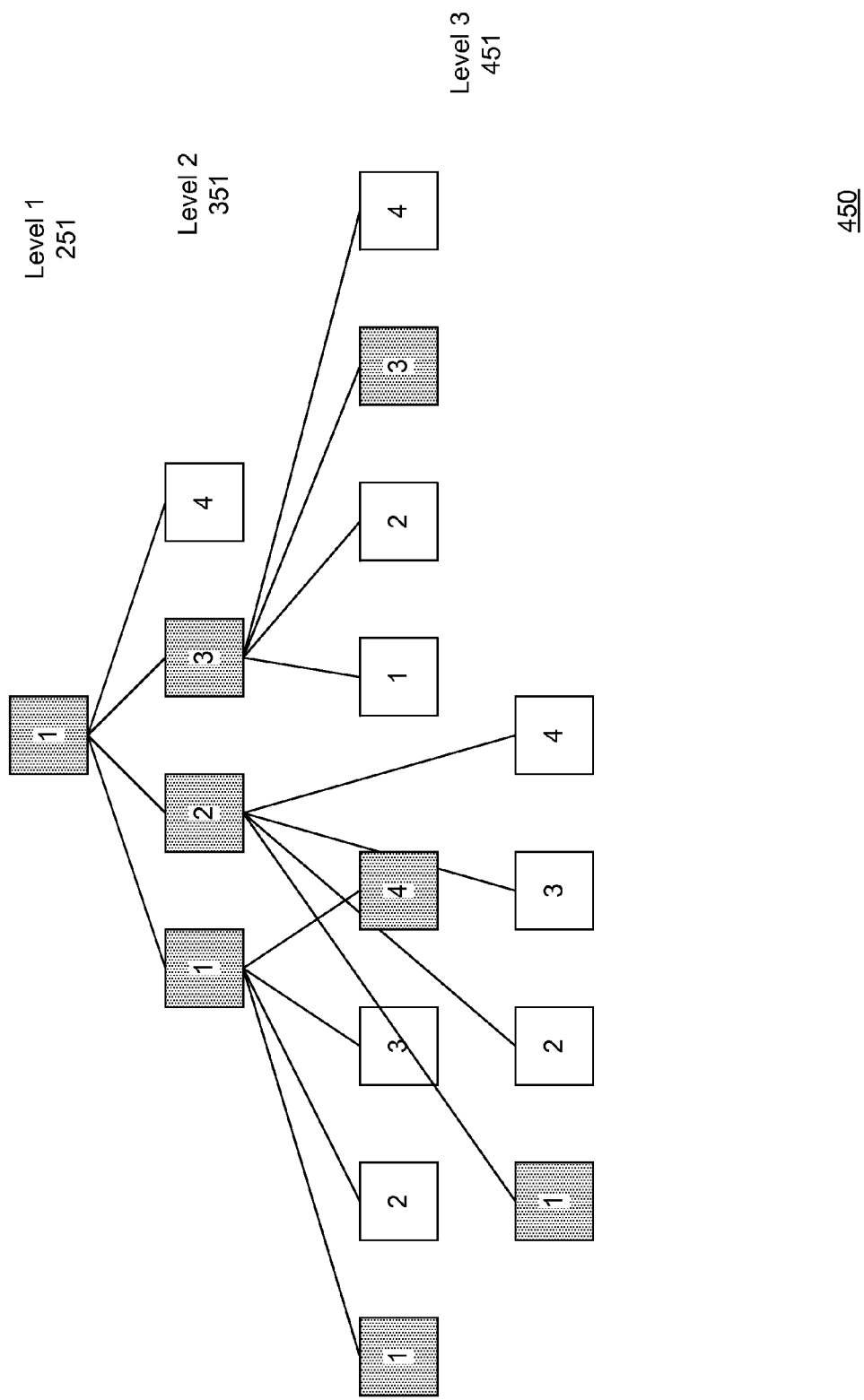
FIG. 4B is an illustration of a quadtree index tree according to an embodiment of the disclosure.

FIG. 4B is an illustration of a quadtree index tree according to an embodiment of the disclosure. At this stage of the index creation process, level 451 (i.e., "Level 3") is added to tree 450 to represent intermediate cells 411-414, 421-424, and 431-434. The nodes of Level 3 representing intermediate cells 411, 414, 421, and 433 are shaded in this embodiment to indicate that each includes the current location and/or a POI.

Figure 5A:
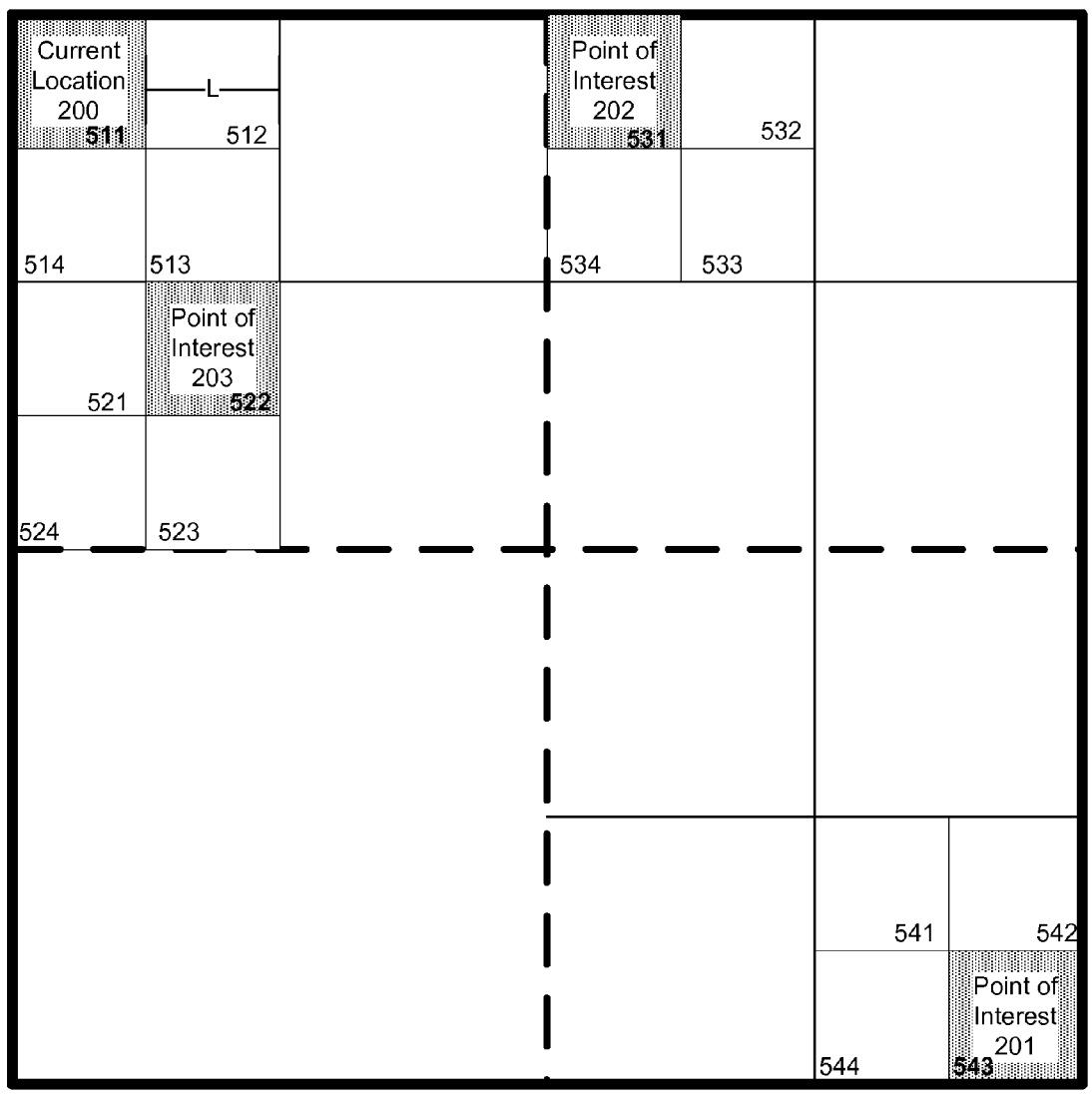
FIG. 5A is an illustration of an index creation operation for a user location and surrounding POIs according to an embodiment of the disclosure.

FIG. 5A is an illustration of an index creation operation for a user location and surrounding POIs according to an embodiment of the disclosure. In this embodiment, cells 411, 414, 421, and 433 of FIG. 4A are each shown to be subdivided into leaf cells 511-514, 521-524, 531-534, and 541-544, respectively. In this embodiment, the remaining intermediate cells of FIG. 4A are not subdivided, as they does contain the user's current location of any POIs. As shown in this illustration, cell 511 includes current location 200, cell 522 includes POI 203, cell 531 includes POI 202, and cell 543 includes POI 201.

The illustrated quadtree subdivision process is shown to stop when cells comprise a similar size as current location 200 (i.e., when the cells comprise width 'L'). Other processes may stop the subdivision process based on any criteria (e.g., predetermined level-depth limit, available memory space for the respective indexes, etc.).

Figure 5B:
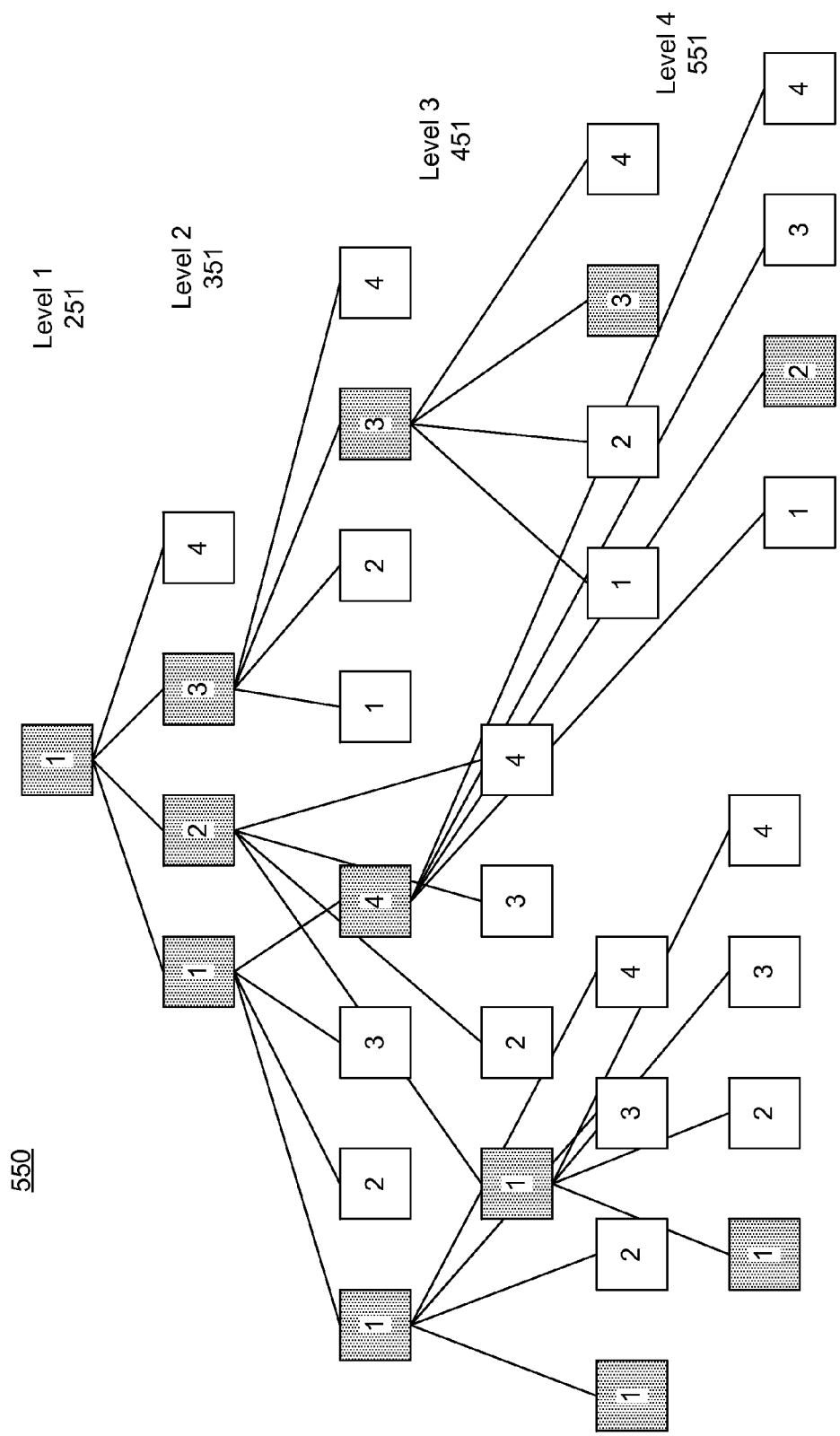
FIG. 5B is an illustration of a quadtree index tree according to an embodiment of the disclosure.

FIG. 5B is an illustration of a quadtree index tree according to an embodiment of the disclosure. At this stage of the index creation process, level 551 (i.e., "Level 4") is added to tree 550 to represent intermediate cells 511-514, 521-524, 531-534, and 541-544. The nodes of Level 4 representing leaf cells 511, 522, 531, and 543 are shaded in this embodiment to indicate that each includes the current location and/or a POI.

In this embodiment, quadtree indexes may be used to represent geo-locations 200-203. As this example comprises a quadtree with four levels, a quadtree index may comprise a four-digit value represented as: [1-4]/[1-4]/[1-4]/[1-4]. Traversing tree 550 from root node to shaded leaf nodes, current user location 200 may be represented as 1111 (i.e., 1/1/1/1), POI 201 may be represented as 1333 (i.e., 1/3/3/3), POI 202 may be represented as 1211 (i.e., 1/2/1/1), and POI 203 may be represented as 1142 (i.e., 1/1/4/2).

As the width of the leaf nodes representing POIs 201-203 comprise the value L, POI queries based on distance values may be answered by simply comparing index values and finding at least partially matching index values. For example, any POI having an index value of 1xxx (i.e., 1/x/x/x) is within 8(√2)L from current location 200. Any POI having index 11xx (i.e., 1/1/x/x) is within 4(√2)L from current location 200; in this example only POI 201 satisfies that criteria, the other POIs are eliminated.

By utilizing indexes that each correspond to a plurality of geo-locations and are based on spatial area subdivisions of a space including the plurality of geo-locations, embodiments of the disclosure eliminate the need for a multiple coordinate system (such as latitude, longitude, elevation) to store location information for geo-locations. Embodiments do not require maintaining a plurality of variables to represent a location. And embodiments do not require computation-intensive operations to determine a distance value between two or more geo-locations in order to answer distance based POI queries.

Figure 6:
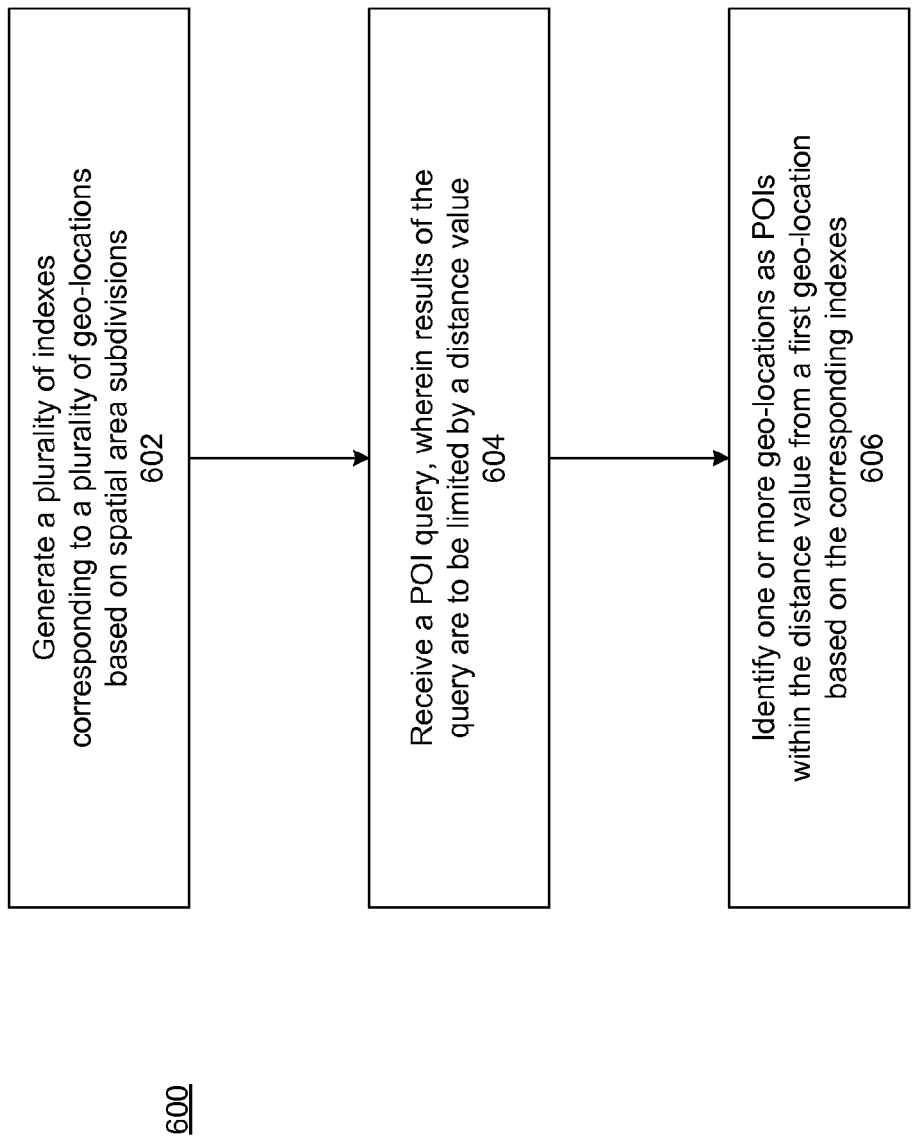
FIG. 6 is an illustration of a process for creating indexes for a plurality of geo-locations based on spatial area subdivisions according to an embodiment of the disclosure.

FIG. 6 is an illustration of a process for creating indexes for a plurality of geo-locations based on spatial area subdivisions according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 600 includes operations for generating a plurality of indexes corresponding to a plurality of geo-locations based on spatial area subdivisions, 602. As discussed above, these spatial area subdivisions are of the space including the plurality of geo-locations. These spatial area subdivisions may comprise quadtree subdivisions of a 2D area surrounding the plurality of geo-locations, octree subdivisions of a 3D space including the plurality of geo-locations, etc. In some embodiments, the subdivision process may continue until a limit is reached—e.g., when partitions comprise a predetermined size, when a predetermined level-depth limit is reached, when a predetermined limit for memory space allocated to the indexes is reached, etc.).

A POI query is received, 604, wherein the results of the query are to be limited by a distance value. This distance value may be specified by the user in the POI query (e.g., a query for POIs within X miles), or may be based on any other distance related criteria (e.g., reasonable walking distance, reasonable driving distance, etc.).

One or more geo-locations are identified as POIs within the distance value from a first geo-location based on the corresponding indexes of the geo-locations, 606. As discussed above, each of the plurality of indexes may comprise identifiers of recursive sub-division levels of the spatial area subdivisions (e.g., single string values based on octree/quadtree node index values, as discussed in the above-described exemplary embodiments). Finding POIs within the distance value from the first geo-location may be done by simply finding at least partially matching index values.

FIG. 7 illustrates a computing device to process user POI queries according to an embodiment of the disclosure. The diagrammatic representation of machine 700 in the exemplary form of a computer system, in accordance with one embodiment, within which a set of instructions, for causing machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Exemplary computer system 700 includes processor 702, main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and secondary memory 718 (e.g., a persistent storage device including hard disk drives and a persistent database and/or a multi-tenant database implementation), which communicate with each other via bus 730. Main memory 704 includes application GUI 724 to present information to a user as well as receive user inputs. Main memory 704 includes audio video stream 723, such as that received by a communications interface (e.g., NIC 708) from a remote service, and main memory 704 further includes user event 725 to be received at application GUI 724 and trigger the user initiated service call in accordance with the embodiments described herein. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute processing logic 726 for performing the operations and functionality which is discussed herein.

Computer system 700 may further include network interface card 708. Computer system 700 also may include user interface 710 (such as a video display unit, a liquid crystal display (LCD), or a cathode ray tube (CRT)), alphanumeric input device 712 (e.g., a keyboard), cursor control device 714 (e.g., a mouse), and signal generation device 716 (e.g., an integrated speaker). Computer system 700 may further include peripheral device 736 (e.g., wireless or wired communication devices, memory devices, storage devices, audio processing devices, video processing devices, etc.).

Secondary memory 718 may include a non-transitory machine-readable storage medium or a non-transitory computer readable storage medium or non-transitory machine-accessible storage medium 731 on which is stored one or more sets of instructions (e.g., software 722) embodying any one or more of the methodologies or functions described herein. Software 722 may also reside, completely or at least partially, within main memory 704 and/or within processor 702 during execution thereof by computer system 700, main memory 704 and processor 702 also constituting machine-readable storage media. Software 722 may further be transmitted or received over network 720 via network interface card 708.

Figure 8A:
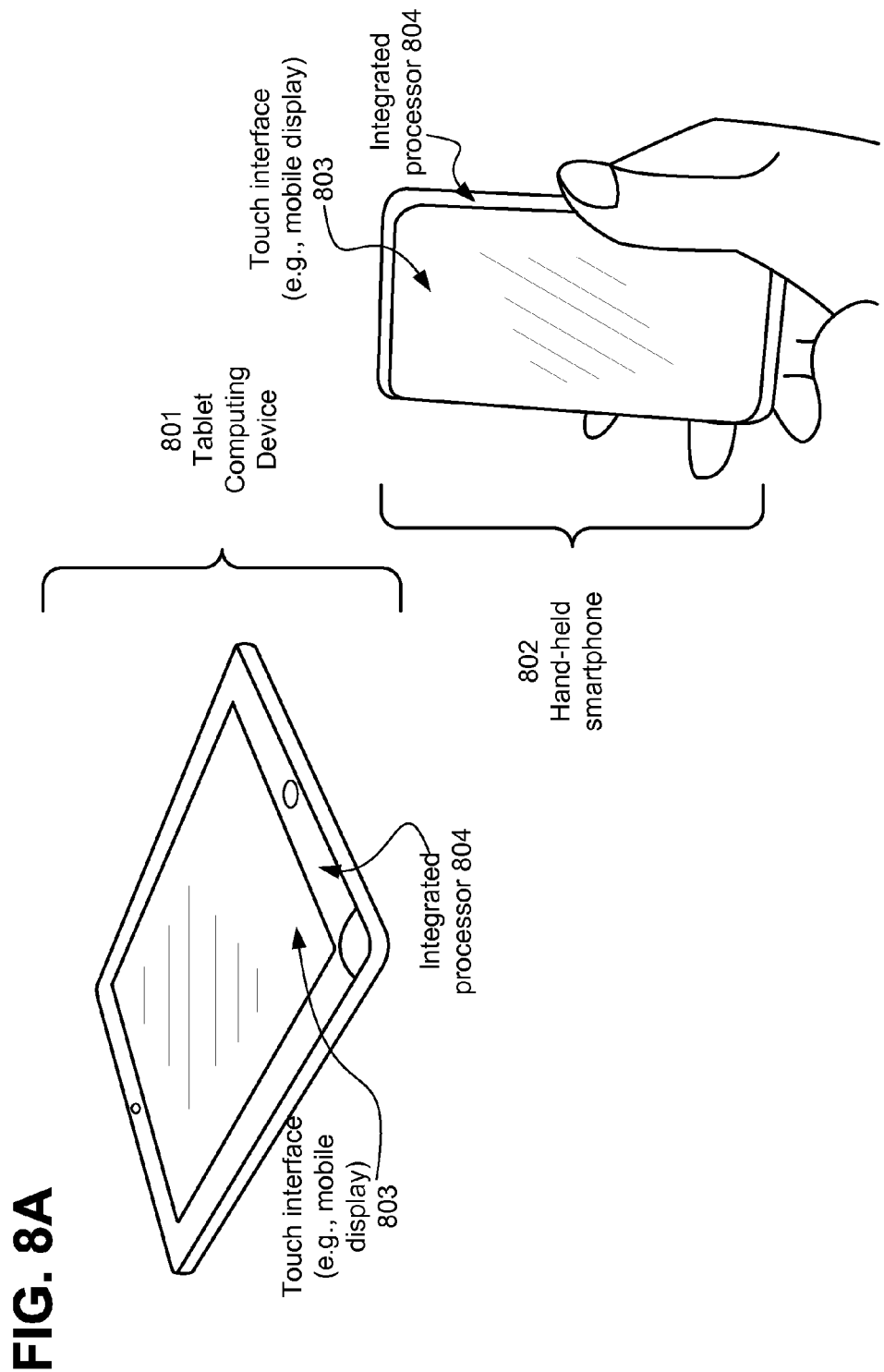
FIG. 8A-FIG. 8B illustrate mobile computing devices for receiving and/or executing user POI queries according to an embodiment of the disclosure.
Figure 8B:
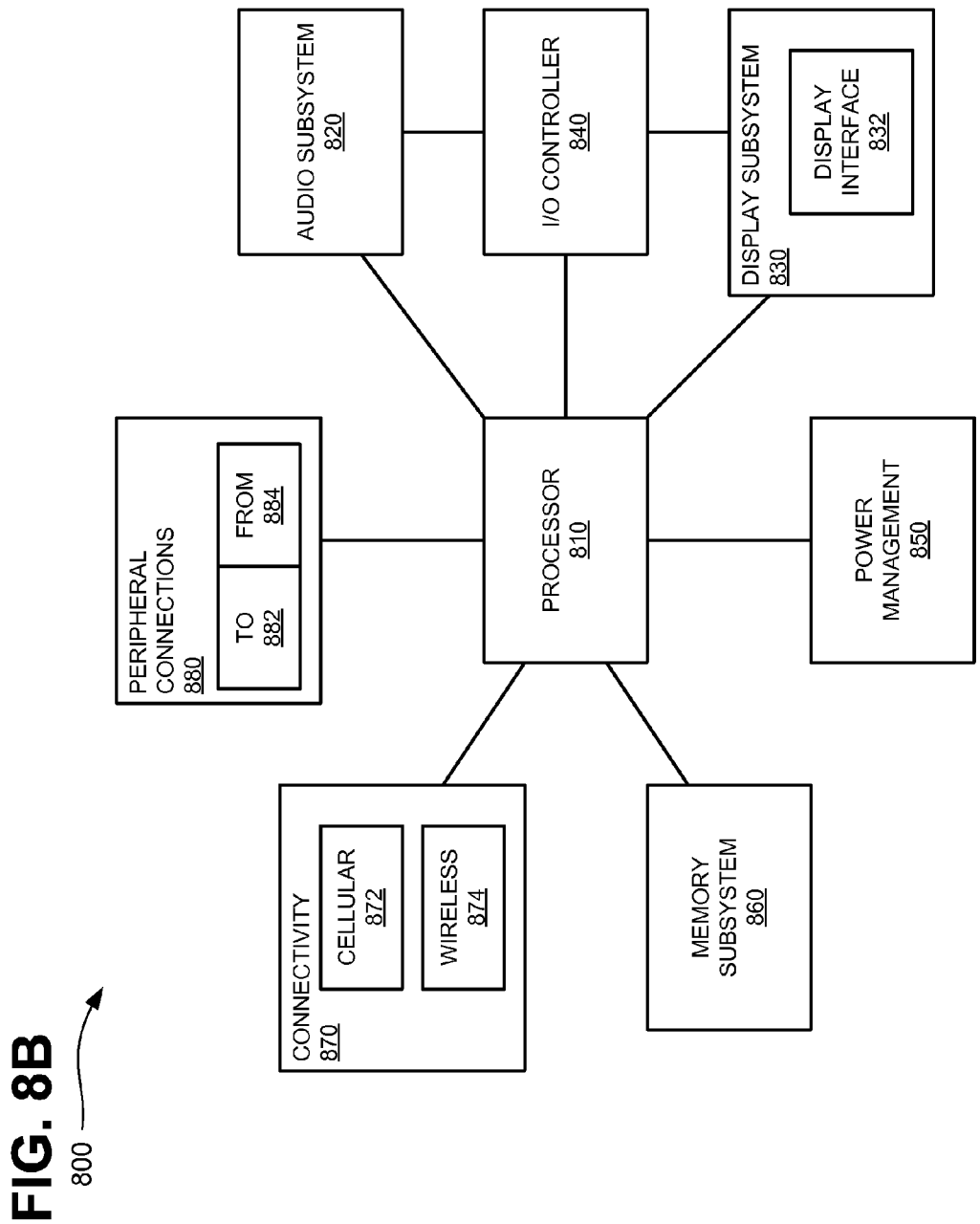

FIG. 8A-FIG. 8B illustrate mobile computing devices for receiving and/or executing user POI queries according to an embodiment of the disclosure. FIG. 8A illustrates two devices—tablet computing device 801 and hand-held smartphone 802, each having a circuitry integrated therein to execute custom index generation processes in accordance with the embodiments discussed above. As depicted, each of tablet computing device 801 and hand-held smartphone 802 include touch interface 803 (e.g., a touchscreen or touch sensitive display) and integrated processor 804 in accordance with disclosed embodiments.

For example, in one embodiment, a system embodies tablet computing device 801 or hand-held smartphone 802, in which a display unit of the system includes touchscreen interface 803 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

FIG. 8B is block diagram of tablet computing device 801, smartphone 802, or any other mobile device to receive user POI queries and/or generate custom indexes for geo-locations. Device 800 is shown to include processor 810, which performs the primary processing operations. Audio subsystem 820 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 810.

Display subsystem 830 represents hardware (e.g., display devices) and software (e.g., drivers) components that provide a visual and/or tactile display for a user to interact with the tablet computing device or smart phone. Display subsystem 830 includes display interface 832, which includes the particular screen or hardware device used to provide a display to a user. In one embodiment, display subsystem 830 includes a touchscreen device that provides both output and input to a user.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to the tablet computing device or smart phone through which a user might interact. In one embodiment, I/O controller 840 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 850 that manages battery power usage, charging of the battery, and features related to power saving operation. Memory subsystem 860 includes memory devices for storing information in the tablet computing device or smart phone. Connectivity 870 includes hardware devices (e.g., wireless and/or wired connectors and communication hardware) and software components (e.g., drivers, protocol stacks) to the tablet computing device or smart phone to communicate with external devices. Cellular connectivity 872 may include, for example, wireless carriers such as GSM (global system for mobile communications), CDMA (code division multiple access), TDM (time division multiplexing), or other cellular service standards). Wireless connectivity 874 may include, for example, activity that is not cellular, such as personal area networks (e.g., Bluetooth), local area networks (e.g., WiFi), and/or wide area networks (e.g., WiMax), or other wireless communication.

Peripheral connections 880 include hardware interfaces and connectors, as well as software components (e.g., drivers, protocol stacks) to make peripheral connections as a peripheral device ("to" 882) to other computing devices, as well as have peripheral devices ("from" 884) connected to the tablet computing device or smart phone, including, for example, a "docking" connector to connect with other computing devices. Peripheral connections 880 include common or standards-based connectors, such as a Universal Serial Bus (USB) connector, DisplayPort including MiniDisplayPort (MDP), High Definition Multimedia Interface (HDMI), Firewire, etc.

An exemplary embodiment may be embodied by a user client device which includes, for example: a processor and a memory to execute instructions at the user client device; an application to execute upon the user client device via the processor and the memory; a graphical interface; an audio interface; a communications interface to communicatively link the user client device with a remote service over a network; the graphical interface to receive a user event within the application triggering a user initiated service call to the remote service via the network; the communications interface to receive an audio and video stream from the remote service via the network responsive to the triggering of the user initiated service call, the audio and video stream displaying at least video of a customer service agent and establishing two way audio communication between the user client device and the remote service; and in which the communications interface further transmits audio captured at the user client device to the remote service and transmits a representation of the application as displayed via the graphical interface of the user client device to the remote service.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system or customers may generally submit data to be stored within the system and execute search queries against such a system, in which case the system returns search results.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A non-transitory computer readable storage media having instructions stored thereon that, when executed by a processor of a computing device, cause the computing device to perform operations comprising:
   generating a plurality of indexes, each corresponding to one of a plurality of geo-locations, based on spatial area subdivisions of a space including the plurality of geo-locations, the indexes organized as tree structures having a different branching factor or a variable number of branches at each node based on geographical distance, wherein the geo-locations correspond to a user location and one or more points of interest (POIs);
   storing the plurality of indexes in a memory device communicatively coupled with the processor;
   receiving a POI query for POIs in corresponding geographic locations, wherein results of the query are to be limited by a geographic distance value and wherein the geographic distance value is determined by comparing index values;
   identifying one or more geo-locations as POIs within the geographic distance value from a first geo-location of the plurality of geo-locations based on the corresponding indexes of the one or more identified geo-locations; and
   causing to be displayed on a graphical display of an electronic device, at least that one or more POIs within the geographic distance value.

2. The non-transitory computer readable storage media of claim 1, wherein each of the plurality of indexes comprise identifiers of recursive sub-division levels of the spatial area subdivisions and each of the plurality of indexes comprise a string of equal length.

3. The non-transitory computer readable storage media of claim 1, wherein the first location comprises a current location of a user.

4. The non-transitory computer readable storage media of claim 1, wherein the first location comprises a location identified in the POIs query.

5. A system comprising:
   a processor;
   a memory communicatively coupled with the processor, the memory including a database comprising information corresponding to a plurality of geo-locations;
   a custom index generation module executed by the processor to:
      generating a plurality of indexes, each corresponding to one of a plurality of geo-locations, based on spatial area subdivisions of a space including the plurality of geo-locations, the indexes organized as tree structures having a different branching factor or a variable number of branches at each node based on geographical distance, wherein the geo-locations correspond to a user location and one or more points of interest (POIs);
      store the plurality of indexes in a memory;
      receive a POI query for POIs in corresponding geographic locations, wherein results of the query are to be limited by a geographic distance value and wherein the geographic distance value is determined by comparing index values;
      identify one or more geo-locations as POIs within the geographic distance value from a first geo-location of the plurality of geo-locations based on the corresponding indexes of the one or more identified geo-locations; and
      cause to be displayed on a graphical display of an electronic device, at least that one or more POIs within the geographic distance value.

6. The system of claim 5, wherein each of the plurality of indexes comprise identifiers of recursive sub-division levels of the spatial area subdivisions.

7. The system of claim 5, wherein the first location comprises a current location of a user.

8. The system of claim 5, wherein the first location comprises a location identified in the POIs query.

* * * * *